(12) United States Patent
Lee et al.

(10) Patent No.: US 8,970,181 B2
(45) Date of Patent: Mar. 3, 2015

(54) APPARATUS AND METHOD TO CHARGE A BATTERY

(75) Inventors: Chang-hum Lee, Anyang-si (KR);
Jeong-gyu Park, Yongin-si (KR);
Hyung-wook Choi, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 477 days.

(21) Appl. No.: 13/097,180

(22) Filed: Apr. 29, 2011

(65) Prior Publication Data

US 2012/0019197 A1 Jan. 26, 2012

(30) Foreign Application Priority Data

Jul. 23, 2010 (KR) .................. 10-2010-0071536

(51) Int. Cl.
| | | |
|---|---|---|
| H02J 7/00 | (2006.01) | |
| H02J 7/04 | (2006.01) | |
| H01M 10/44 | (2006.01) | |
| H01M 10/42 | (2006.01) | |

(52) U.S. Cl.
CPC ............. *H02J 7/0004* (2013.01); *H01M 10/44* (2013.01); *H02J 7/0047* (2013.01); *H02J 7/042* (2013.01); *H02J 2007/0098* (2013.01); *H01M 10/4257* (2013.01)
USPC ........... 320/160; 320/128; 320/130; 320/134; 320/107; 320/162

(58) Field of Classification Search
USPC .................. 320/107, 128, 130, 134, 160, 162
See application file for complete search history.

(56) References Cited

U.S. PATENT DOCUMENTS

| | | | |
|---|---|---|---|
| 6,331,762 B1 | 12/2001 | Bertness | |
| 6,396,407 B1 * | 5/2002 | Kobayashi | 340/636.12 |
| 6,483,274 B2 * | 11/2002 | Lee | 320/132 |
| 7,202,635 B2 * | 4/2007 | Patino et al. | 320/160 |
| 7,518,340 B2 * | 4/2009 | Sterz et al. | 320/132 |
| 7,633,269 B2 * | 12/2009 | Chou et al. | 320/162 |
| 7,683,579 B2 * | 3/2010 | Kim et al. | 320/132 |
| 7,880,435 B2 * | 2/2011 | Ibrahim | 320/122 |
| 7,995,361 B2 * | 8/2011 | Park | 363/21.12 |
| 8,198,856 B2 * | 6/2012 | Koide et al. | 320/106 |
| 2007/0013346 A1 * | 1/2007 | Oh | 320/160 |
| 2008/0007223 A1 | 1/2008 | Morioka | |
| 2008/0093930 A1 * | 4/2008 | Chen | 307/66 |
| 2008/0111556 A1 * | 5/2008 | Yano | 324/433 |
| 2008/0211451 A1 * | 9/2008 | Zhang et al. | 320/101 |
| 2008/0211460 A1 | 9/2008 | Tarng et al. | |
| 2009/0108810 A1 | 4/2009 | Sawyers | |
| 2009/0206799 A1 | 8/2009 | Su | |
| 2010/0201317 A1 * | 8/2010 | Shiu et al. | 320/116 |

OTHER PUBLICATIONS

Extended European Search Report issued Dec. 22, 2011 in EP Application No. 11165366.3

* cited by examiner

*Primary Examiner* — M'baye Diao
(74) *Attorney, Agent, or Firm* — Staas & Halsey LLP

(57) ABSTRACT

An apparatus and a method to charge a battery, the battery charging apparatus including: a battery unit which is chargeable; a battery charging unit which charges the battery unit; and a controller which adjusts a preset charge voltage of the battery unit based on a charge allowance capacity of the battery unit to have a predetermined value, and controls the battery charging unit to output the adjusted charge voltage and to charge the battery unit. Accordingly, the apparatus and method are capable of charging a battery based on a charge allowance capacity decreased owing to deterioration of the battery to safely use the battery and to extend a life of the battery.

25 Claims, 9 Drawing Sheets

APPARATUS AND METHOD TO CHARGE A BATTERY

CROSS-REFERENCE TO RELATED APPLICATIONS

This application claims the benefit of priority under 35 U.S.C. §119 from Korean Patent Application No. 10-2010-0071536, filed on Jul. 23, 2010 in the Korean Intellectual Property Office, the disclosure of which is incorporated herein by reference in its entirety.

BACKGROUND

1. Field of the Invention

Apparatuses and methods consistent with the exemplary embodiments relate to an apparatus and a method to charge a battery, and more particularly, to an apparatus to charge a battery which adjusts a preset charge voltage and/or charge current of a chargeable battery unit based on a current charge allowance capacity of the battery unit and charges the battery unit with the adjusted charge voltage and/or charge current, and a method of charging a battery.

2. Description of the Related Art

An important issue for a portable electronic device is a life expectancy of a chargeable battery. When the battery is repeatedly charged and discharged, ions in a storage cell of the battery deteriorate to become in an unstable state, and accordingly an explosion of the battery or the like may occur. When the battery becomes deteriorated, a full charge capacity (FCC) of the battery is decreased by an amount depending on a deterioration degree. However, when the battery is charged without considering the decreased FCC, a serious accident, such as explosion of the battery, may occur, which can put people and/or other components/items at risk.

SUMMARY

Accordingly, one or more exemplary embodiments provide an apparatus and a method to charge a battery which charge the battery based on a charge allowance capacity decreased relative to the deterioration amount of the battery, to safely use the battery and to extend a life of the battery.

In addition, one or more exemplary embodiments provide an apparatus and a method to charge a battery which adjust a charge voltage and/or charge current output to the battery based on a charge allowance capacity decreased relative to a deterioration amount of the battery, to charge the battery with the adjusted charge voltage and/or the adjusted charge current.

Additional features and utilities of the present general inventive concept will be set forth in part in the description which follows and, in part, will be obvious from the description, or may be learned by practice of the present general inventive concept.

Embodiments of the present inventive concept may be achieved by providing a battery charging apparatus including: a battery unit which is chargeable; a battery charging unit which charges the battery unit; and a controller which adjusts a preset charge voltage of the battery unit based on a charge allowance capacity of the battery unit to have a predetermined value, and controls the battery charging unit to output the adjusted charge voltage and to charge the battery unit.

The controller may adjust a preset charge current of the battery unit based on the charge allowance capacity of the battery unit to have a predetermined value, and control the battery charging unit to output the adjusted charge current and to charge the battery unit.

The battery charging apparatus may further include an interface unit which communicates with the battery unit and receives information about the battery unit, and the information about the battery unit may include at least one of the preset charge current, the preset charge voltage, a preset charge capacity, and a current charge allowance capacity of the battery unit.

The controller may control the battery charging unit to drop the preset charge voltage of the battery unit to a predetermined value based on the charge allowance capacity of the battery unit received through the interface unit so that an adjusted charge voltage is output.

The controller may drop the preset charge voltage of the battery unit by a difference between the preset charge capacity and the charge allowance capacity of the battery unit to adjust the charge voltage.

The controller may adjust the preset charge current of the battery unit to be decreased by a half of a difference between the preset charge capacity and the charge allowance capacity of the battery unit.

The controller may adjust the preset charge current and the preset charge voltage of the battery unit based on the charge allowance capacity to have predetermined values when the charge allowance capacity received through the interface unit is a predetermined value or less.

The charge allowance capacity may be distinguished in a plurality of steps, and the preset charge current and the preset charge voltage may be adjusted to have predetermined values preset corresponding to the steps.

The battery charging apparatus may further include a display unit, and the controller may control the display unit to display that the battery unit needs charging when the charge allowance capacity received through the interface unit is a preset value or less.

The controller may control the battery charging unit to prevent the battery unit from being charged when the charge allowance capacity received through the interface unit is the preset value or less.

The battery charging apparatus may further include a power supply which provides power to the battery charging unit.

The battery unit may include a smart battery.

The foregoing and/or other features may also be achieved by providing a battery charging method of a battery charging apparatus, the battery charging method including: receiving information about a preset charge voltage and a charge allowance capacity from a chargeable battery unit through an interface unit; adjusting, by a controller, the preset charge voltage based on the received charge allowance capacity to have a predetermined value; and controlling a battery charging unit to output the adjusted charge voltage and charging the battery unit.

The battery charging method may further include: receiving information about a preset charge current from the battery unit through the interface unit; adjusting, by the controller, the preset charge current based on the received charge allowance capacity to have a predetermined value; and controlling the battery charging unit to output the adjusted charge current and charging the battery unit.

The adjusting the charge voltage may drop the preset charge voltage to a predetermined value based on the charge allowance capacity to adjust the charge voltage.

The adjusting the charge voltage may drop the preset charge voltage of the battery unit by a difference between the preset charge capacity and the charge allowance capacity of the battery unit to adjust the charge voltage.

The adjusting the charge current may adjust the preset charge current to be decreased by a half of a difference between the preset charge capacity and the charge allowance capacity of the battery unit.

The adjusting may adjust the preset charge current and the preset charge voltage based on the charge allowance capacity to have predetermined values when the charge allowance capacity is a predetermined value or less.

The charge allowance capacity may be distinguished in a plurality of steps, and the preset charge current and the preset charge voltage may be adjusted to have predetermined values preset corresponding to the steps.

The battery charging method may further include displaying, on a display unit, that the battery unit needs charging when the charge allowance capacity received from the battery unit is a preset value or less.

The battery charging method may further include controlling, by the controller, the battery charging unit to prevent the battery unit from being charged when the charge allowance capacity received from the battery unit is the preset value or less.

The battery unit may include a smart battery.

The foregoing and/or other features may also be achieved by providing a battery charging apparatus, including an interface unit which communicates with a battery unit to determine a chargeable state thereof, a battery charging unit which charges the battery unit, and a controller which adjusts a preset charge power of the battery unit to be in a predetermined range based on a charge allowance capacity of the battery unit and controls the battery charging unit to output the adjusted charge power and to charge the battery unit.

As described above, in an apparatus and a method to charge a battery according to an aspect of exemplary embodiments, since a charge allowance capacity is decreased owing to deterioration of a chargeable battery unit, a preset charge voltage and/or a preset charge current of the battery unit is adjusted based on the decreased charge allowance capacity, so that the battery unit is charged with the adjusted charge voltage and/or the adjusted charge current.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF THE EMBODIMENTS

Figure 1:
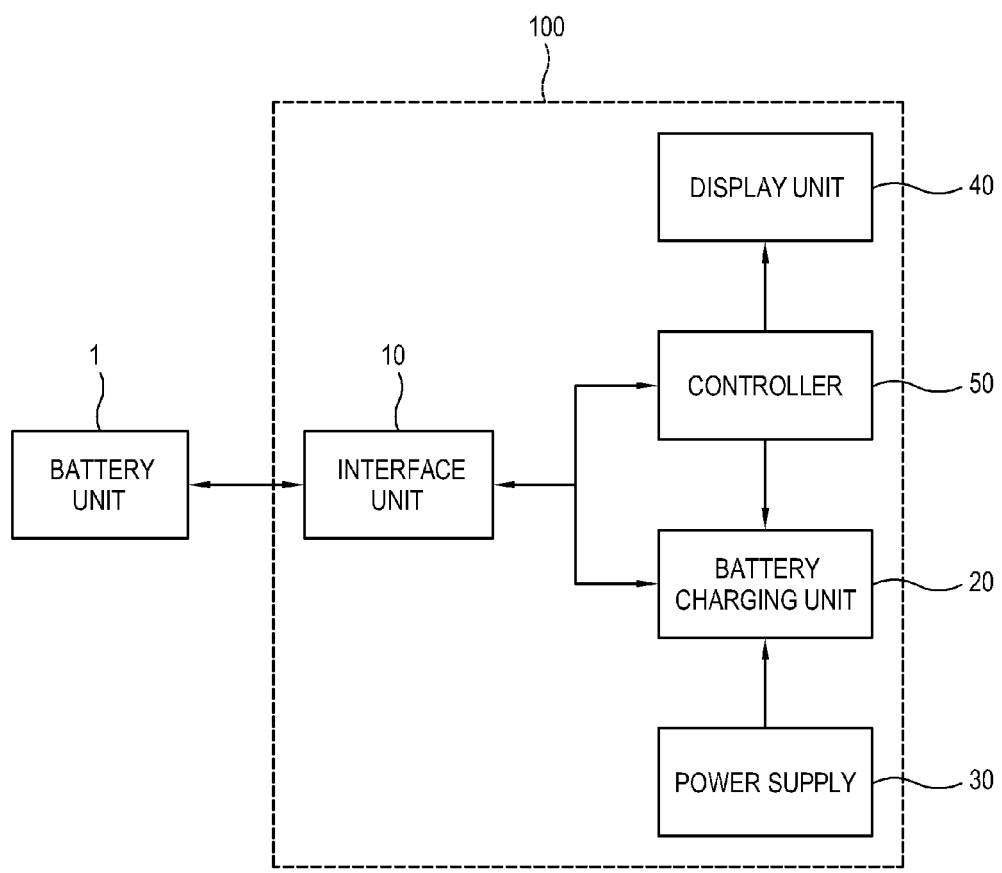
FIG. 1 is a control block diagram of a battery charging apparatus according to an exemplary embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

FIG. 1 is a control block diagram of a battery charging apparatus according to an exemplary embodiment.

The battery charging apparatus 100 of the present embodiment may include any kind of mobile electronic devices including a chargeable battery. For example, the battery charging apparatus 100 may include any portable electronic device including a chargeable battery which is a portable computer system, such as a laptop, a smart book, a mobile internet device (MID), and a netbook, a portable media player (PMP), a navigator, a personal digital assistant (PDA), and the like.

When the battery charging apparatus 100 of the present embodiment is a portable computer system, the battery charging apparatus 100 may include a central processing unit (not shown), a main memory (not shown), a memory controller hub (MCH, not shown), an I/O controller hub (ICH, not shown), a graphic controller (not shown), a display unit (not shown), and a peripheral device (not shown), which are generally included in a computer system. The CPU is a component to control an overall operation of the computer system and implements a computer program loaded in the main memory. The CPU communicates with the MCH and the ICH and controls the MCH and the ICH, respectively, when implementing the computer program. The main memory temporarily stores data associated with carrying out an operation of the CPU including computer programs implemented by the CPU. The main memory is a volatile memory and may be realized as a double data rate synchronous dynamic random access memory (DDR SDRAM), for example. The graphic controller processes graphic data to be displayed on the display unit. The peripheral device may be various types of hardware, including a hard disk drive, a flash memory, a CD-ROM, a DVD-ROM, a USB drive, a Bluetooth adaptor, a modem, a network adaptor, a sound card, a speaker, a microphone, a tablet, a touch screen, and the like. The MCH interfaces a component, such as the CPU or the like, with the main memory to read and write a data. The ICH interfaces the CPU with the peripheral device to communicate. Computer programs implemented by the CPU of the present embodiment may include BIOS, an operating system, and applications. In the present embodiment, the BIOS may be stored in a BIOS ROM (not shown), which is a nonvolatile memory, and the operating system and the applications may be installed, for example, in a hard disk drive.

The battery charging apparatus 100 according to the present embodiment includes a battery unit 1, an interface unit 10, a battery charging unit 20, a display unit 40, a power supply 30, and a controller 50 to control the above components.

The battery unit 1 has a predetermined capacity to be charged with power and may be charged with power supplied from the power supply 30. The chargeable battery unit 1 may include an internal battery included in the battery charging apparatus 100 or an external battery connected to the battery charging apparatus 100 outside.

The battery unit 1 may be a smart battery. The smart battery may include a storage cell (not shown) to be charged with power, and a circuit and a memory to identify information about and/or characteristics of the battery and to store the information and/or characteristics.

Here, a plurality of storage cells may be included depending on a desired charge capacity of the battery unit 1. Here, the information about and/or characteristics of the battery may include at least one of unique identification information about the battery unit, a preset charge capacity indicating a chargeable capacity preset when the battery unit 1 is manufactured, a preset charge voltage and/or a preset charge current corresponding to the preset charge capacity, and a charge allowance capacity indicating a total charge capacity currently charged by the battery unit 1.

Initially, the charge allowance capacity of the battery 1 is substantially the same as the preset charge capacity. However, when charging/discharging of the battery unit 1 is repeated, ions in the storage cell deteriorate to continually decrease the charge allowance capacity, and accordingly a life of the battery unit 1 is gradually reduced. Further, the charge allowance capacity may be changed by various factors, such as a surrounding temperature and conditions for use, in addition to a number of charging/discharging times. Thus, the charge allowance capacity of the smart battery may be measured and determined periodically to identify a state of the battery unit 1.

The interface unit 10 communicates with the battery unit 1 to receive information about and/or characteristics of the battery unit 1, such as, for example, the chargeability status of the battery unit 1, as discussed in more detail below. The interface unit 10 requests information about the battery unit 1 from the battery unit 1 by control of the controller 50, and receives the information about the battery unit 1 in response to the request to transmit such information to the controller 50.

When the battery unit 1 is realized as a smart battery, the interface unit 10 may be provided as a control communication bus of a peripheral device of a computer, which is referred to as SMbus.

The battery charging unit 20 includes a charging circuit to charge the battery unit 1. The battery charging unit 20 outputs a charge voltage and/or a charge current to the battery unit 1 by control of the controller 50 so that the battery 1 is charged with power. Hereinafter, an operation of the controller 50 will be described further.

The power supply 30 may provide power to a component of the battery charging apparatus 100. The power supply 30 may further include an alternating current-direct current (AC-DC) converter (not shown) to covert common AC power input from an external source to DC power. Thus, the converted power may be supplied to the component of the battery charging apparatus 100.

Further, the converted power may be provided to the battery charging unit 20 by control of the controller 50 so that the battery unit 1 can be charged.

The display unit 40 can display information regarding whether the battery unit 1 needs charging by control of the controller 50 when the charge allowance capacity of the battery unit 1 is in a preset value or less. The display unit 40 may be provided as one of a variety of display panels, such as a liquid crystal display (LCD).

The controller 50 adjusts the preset charge voltage of the battery unit 1 to be in a predetermined range based on the charge allowance capacity of the battery unit 1, and controls the battery charging unit 20 to output the adjusted charge voltage and to charge the battery unit 1 accordingly.

Further, the controller 50 adjusts the preset charge current of the battery unit 1 to be in a predetermined range based on the charge allowance capacity of the battery unit 1, and controls the battery charging unit 20 to output the adjusted charge current and to charge the battery unit 1 accordingly.

In addition, the controller 50 respectively adjusts the preset charge voltage and the preset charge current of the battery unit 1 to be in a predetermined range based on the charge allowance capacity of the battery unit 1, and also controls the battery charging unit 20 to output power having the adjusted charge voltage and the adjusted charge current and to charge the battery unit 1 accordingly.

The controller 50 may be realized as a microcomputer in the battery charging apparatus 100.

Hereinafter, a control operation of the controller 50 is described further with reference to the drawings.

Figure 2:
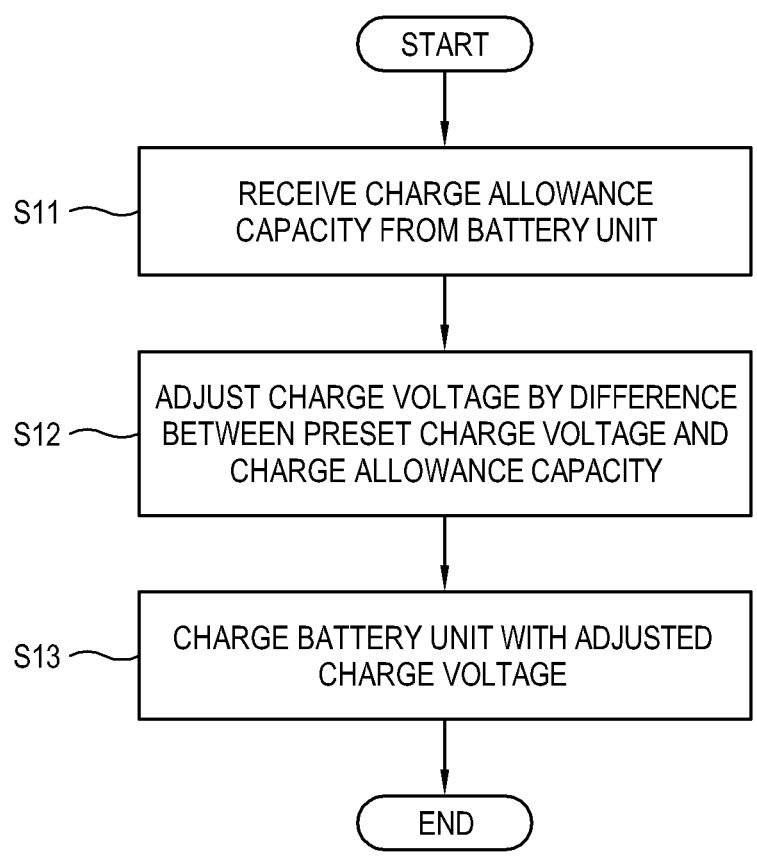
FIG. 2 is a flowchart illustrating charging control by a battery charging apparatus according to an exemplary embodiment.

FIG. 2 is a flowchart illustrating charging control by a battery charging apparatus according to an exemplary embodiment.

As shown in FIG. 2, the controller 50 controls the interface unit 10 to receive information about the battery unit 1 from the battery unit 1 that is connected to the battery charging apparatus 100 at operation S11. The information about the battery unit 1 may include at least one of unique identification information about the battery unit 1, a preset charge capacity indicating a chargeable capacity preset when the battery unit 1 is manufactured, a preset charge voltage and/or a preset charge current corresponding to the preset charge capacity, and a charge allowance capacity indicating a total charge capacity currently charged by the battery unit 1.

The controller 50 compares the preset charge capacity of the battery unit 1 with the charge allowance capacity among the information about the battery unit received through the interface unit 10. When the charge allowance capacity is decreased as compared with the preset charge capacity, a decreased amount is calculated. Then, a charge voltage is adjusted by subtracting the decreased amount of the charge allowance capacity from the preset charge voltage received through the interface unit.

Here, when the charge voltage is adjusted, the controller 50 may consider a number of storage cells included in the battery unit and a voltage resolution of the storage cells. The voltage resolution of the storage cells may be various such as an 8 bit resolution, a 16 bit resolution, and the like. A resolution of the storage cells is divided into a plurality of steps, and any step of the steps corresponding to the charge allowance capacity may be considered, which is expressed by the following equation.

$$\text{Adjusted charge voltage} = \text{preset charge voltage} - (1 - \text{charge allowance capacity}) \times (\text{number of storage cells/step})$$

Thus, based on the equation of adjusting a charge voltage, the controller 50 calculates a charge voltage adjusted by substituting the charge allowance capacity and the preset charge voltage received from the interface unit 10 at operation S12.

The controller 50 controls the battery charging unit 20 to output power having the calculated charge voltage and to charge the battery unit 1 accordingly at operation S13. When the battery unit 1 is completely charged, the controller 50 controls the battery charging unit 20 to no longer charge the battery unit 1, so that charging of the battery unit 1 terminates.

In addition to adjusting the charge voltage by the battery charging apparatus according to the embodiment as described above, the controller 50 may decrease the preset charge current received through the interface unit 10 by a predetermined range using a known method to adjust the charge current and control the battery charging unit 20 to output power having the adjusted charge current. For example, the controller 50 can adjust the received preset charge current to have 0.7 times the charge current and can control the battery charging unit 20 to output power having the adjusted charge current.

Figure 3:
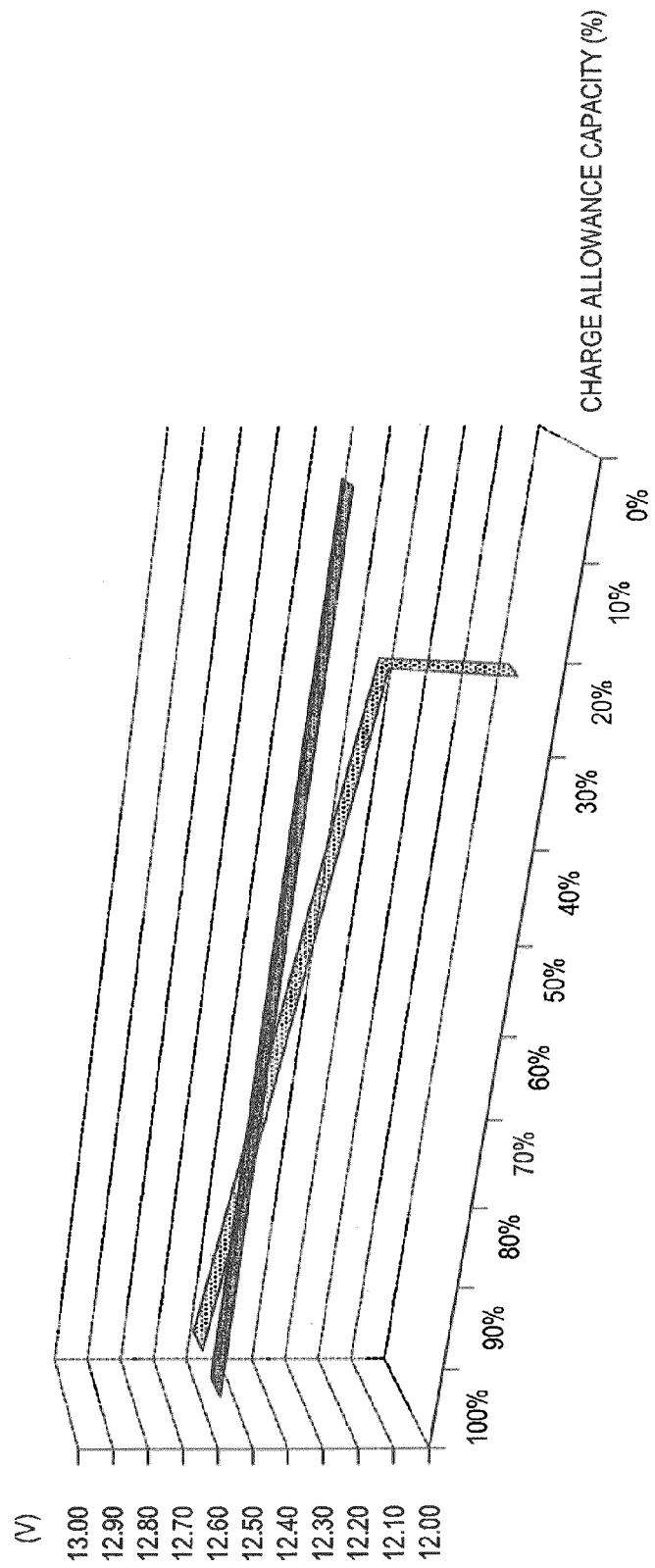
FIG. 3 illustrates a result of adjusting a charge voltage by the battery charging apparatus according to the exemplary embodiment of FIG. 2.

FIG. 3 illustrates a result of adjusting a charge voltage by the battery charging apparatus according to the present exemplary embodiment.

FIG. 3 shows that a charge voltage is adjusted by the battery charging apparatus according to the present embodiment, as described with reference to FIG. 2.

According to a conventional battery charging method, when charge power output from a battery charging unit is adjusted to charge a battery unit, only a preset charge current of the battery unit is adjusted, but a preset charge power value of the battery unit is not adjusted. (See the solid black curve in the graph of FIG. 3.)

However, when charge power output from the battery charging unit is adjusted to charge the battery unit by the battery charging apparatus according to the present embodiment, the preset charge voltage of the battery unit is adjusted, so that the battery unit 1 may be charged with power having the adjusted charge voltage.

In the graph of FIG. 3, an x-axis represents a percentage of the charge allowance capacity with respect to the preset charge capacity of the battery unit 1, and a y-axis represents a charge voltage (V). In the battery charging apparatus according to this embodiment, the charge voltage is adjusted to be low as the charge allowance capacity decreases. (See the dotted gray curve in the graph of FIG. 3.)

Thus, the charge voltage may be adjusted linearly corresponding to the current charge allowance capacity of the battery unit by the battery charging apparatus according to the present embodiment.

Figure 4:
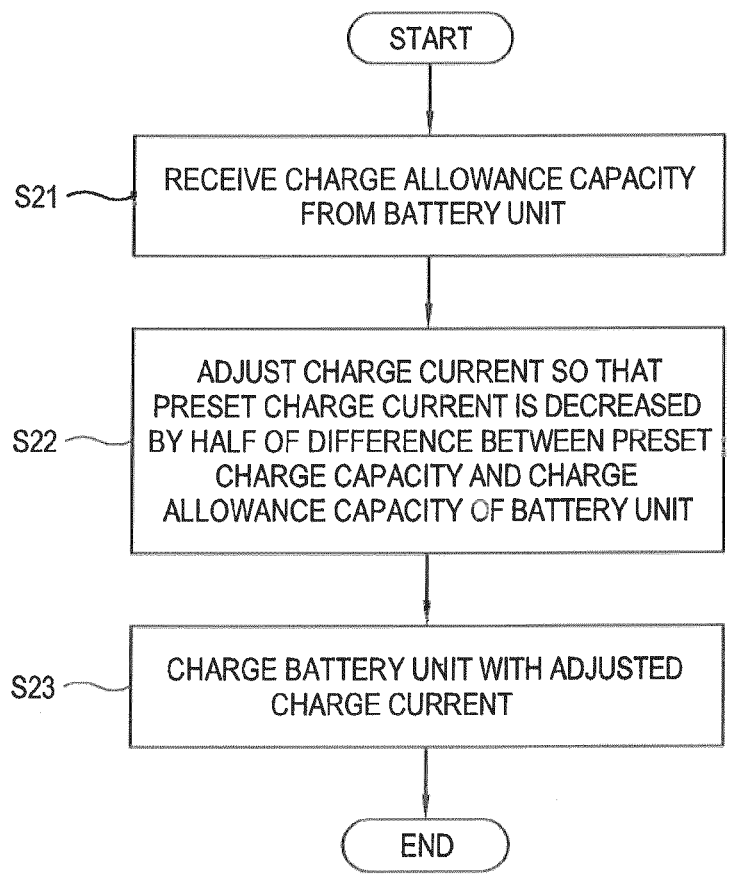
FIG. 4 is a flowchart illustrating charging control by a battery charging apparatus according to another exemplary embodiment.

FIG. 4 is a flowchart illustrating charging control by a battery charging apparatus according to another exemplary embodiment.

As shown in FIG. 4, the controller 50 controls the interface unit 10 to receive information about the battery unit 1 from the battery unit 1 connected to the battery charging apparatus at operation S21. The information about the battery unit 1 is described above with reference to FIG. 2, and thus a repeated description thereof is omitted herein for brevity.

The controller 50 compares the preset charge capacity of the battery unit 1 with the charge allowance capacity among the information about the battery unit 1 received through the interface unit 10. When the charge allowance capacity is decreased as compared with the preset charge capacity, a decreased amount is calculated. Then, a charge voltage is adjusted by subtracting a half of the decreased amount of the charge allowance capacity from the preset charge current received through the interface unit, which is expressed by the following equation.

Adjusted charge current=preset charge current−(preset charge capacity−charge allowance capacity)/2

Thus, based on the equation of adjusting a charge current, the controller 50 calculates a charge current adjusted by substituting the charge allowance capacity and the preset charge current received from the interface unit 10 at operation S22.

The controller 50 controls the battery charging unit 20 to output a power having the calculated charge current and to charge the battery unit 1 accordingly at operation S23. When the battery unit 1 is completely charged, the controller 50 controls the battery charging unit 20 to no longer charge the battery unit 1, so that charging of the battery unit 1 terminates.

When the charge current is adjusted by the battery charging apparatus 100 according to this embodiment, as described above, the controller 50 may apply the preset charge voltage received from the interface unit 10 as it is, while adjusting the charge current, to control the battery charging unit 20 to charge the battery unit 1.

Figure 5:
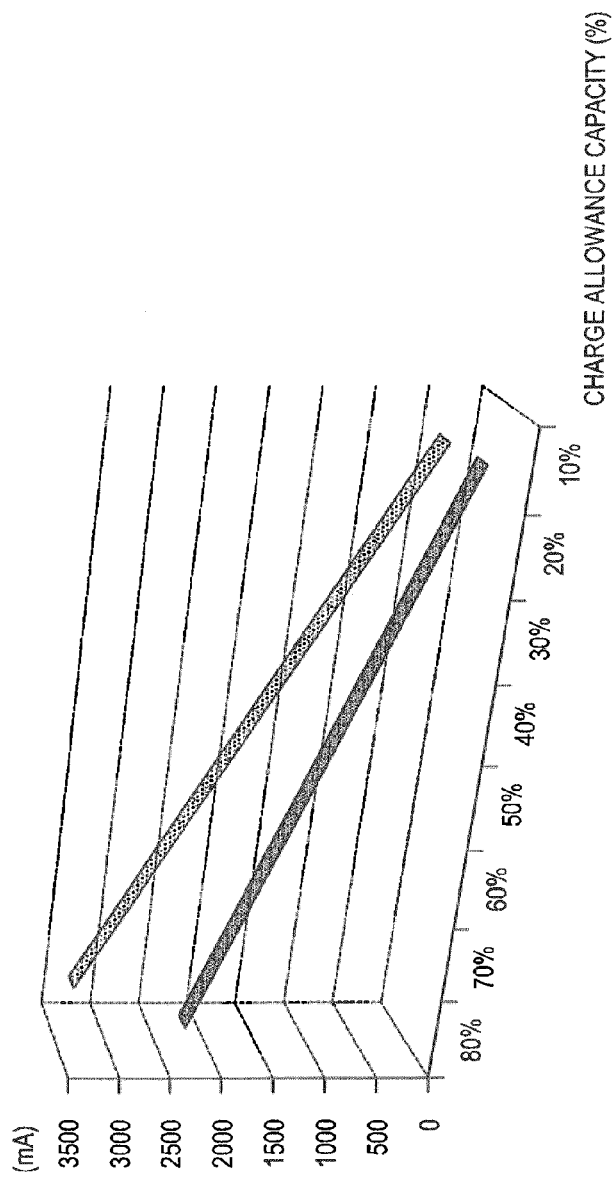
FIG. 5 illustrates a result of adjusting a charge current by the battery charging apparatus according to another exemplary embodiment.

FIG. 5 illustrates a result of adjusting a charge current by the battery charging apparatus according to this exemplary embodiment.

FIG. 5 shows that a charge current is adjusted by the battery charging apparatus according to the embodiment described with reference to FIG. 4.

According to a conventional battery charging method, when charge power output from a battery charging unit is adjusted to charge a battery unit, a preset charge current of the battery unit is adjusted to have 0.7 times the preset charge current. (See the solid black curve in the graph of FIG. 5.)

However, when the preset charge current of the battery unit is adjusted by the equation of adjusting the charge current mentioned with reference to the embodiment of FIG. 4 by the battery charging apparatus 100, the charge current has a lower value than the charge current adjusted by the conventional method.

In the graph of FIG. 5, an x-axis represents a percentage of the charge allowance capacity with respect to the preset charge capacity of the battery unit, and a y-axis represents a charge current (mA). In the battery charging apparatus according to the present embodiment, the charge current is adjusted to have a lower value than by the conventional method. (See the dotted gray curve in the graph of FIG. 5.)

Thus, a battery according to the present embodiment can have a longer life than by the conventional battery charging method.

Figure 6:
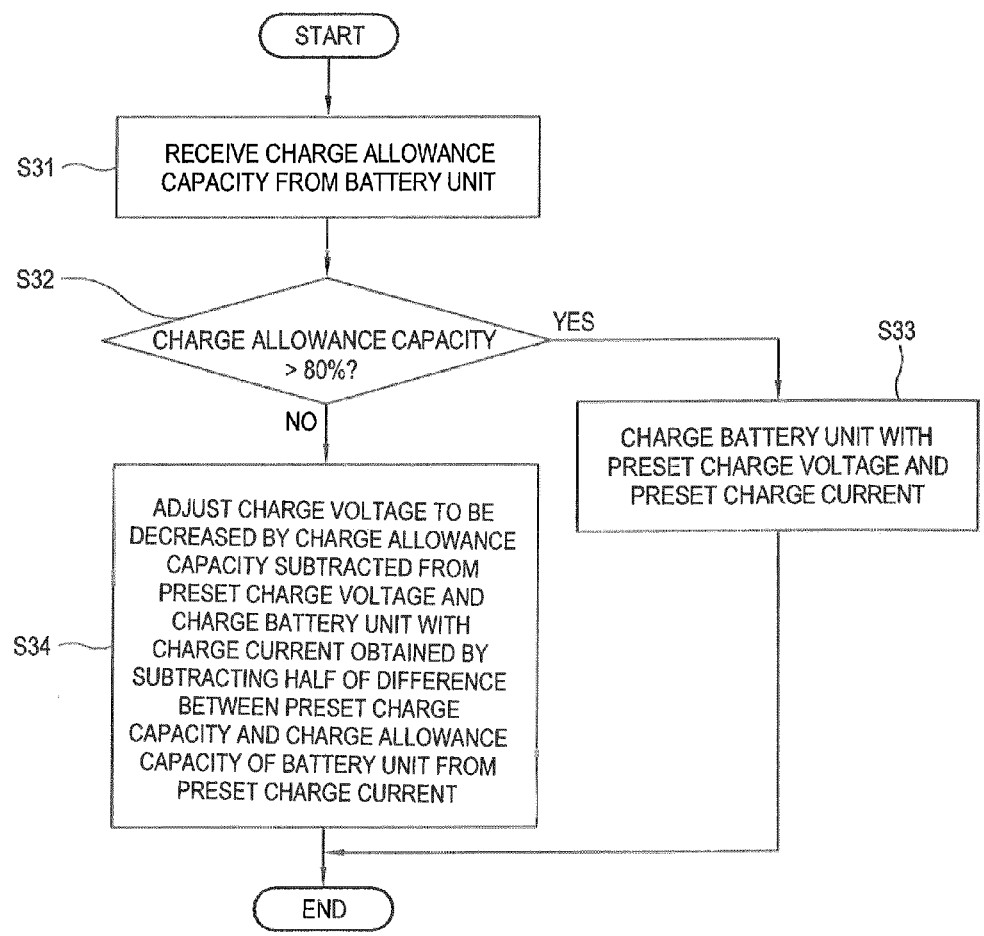
FIG. 6 is a flowchart illustrating charging control by a battery charging apparatus according to still another exemplary embodiment.

FIG. 6 is a flowchart illustrating charging control by a battery charging apparatus according to another exemplary embodiment.

In the battery charging apparatus according to this embodiment of FIG. 6, the controller 50 adjusts the preset charge voltage and the preset charge current of the battery unit 1 based on the charge allowance capacity of the battery unit 1 using both the adjustment of the charge voltage described in the embodiment of FIG. 2 and the adjustment of the charge current described in the embodiment of FIG. 4, and controls the battery charging unit 20 to output power having the adjusted charge voltage and the adjusted charge current.

As shown in FIG. 6, the controller 50 controls the interface unit 10 to receive information about the battery unit 1 from the battery unit 1 which is currently connected to the battery charging apparatus 100 at operation S31. The information about the battery unit 1 is described above with reference to FIG. 2, and thus a description thereof is omitted herein for brevity.

The controller 50 calculates a percentage of the charge allowance capacity with respect to the preset charge capacity of the battery unit 1 using the information about the battery unit 1 received from the interface unit 10. Then, the controller 50 determines whether the calculated percentage of the charge allowance capacity is a predetermined value or more at operation S32. According to an embodiment, when the predetermined value is 80% or more, the controller 50 determines the calculated percentage of the charge allowance capacity. Then, when the calculated percentage of the charge allowance capacity is identified to be 80% or more, the controller 50 controls the battery charging unit 20 to output a power having the preset charge voltage and the preset charge current received through the interface unit 10 as they are to the battery unit 1 (operation S33).

When the calculated percentage of the charge allowance capacity is less than 80%, the controller 50 respectively adjusts the preset charge voltage and the preset charge current of the battery unit 1 received through the interface unit 10 based on the charge allowance capacity to have a predetermined value, and controls the battery charging unit 20 to output a power having the adjusted charge voltage and the adjusted charge current.

According to an embodiment, the controller 50 may adjust the preset charge voltage by the equation of adjusting the charge voltage described in the embodiment of FIG. 2 and may also adjust the preset charge current by the equation of adjusting the charge current described in the embodiment of FIG. 4.

The controller 50 controls the battery charging unit 20 to output a power having the adjusted charge voltage and the adjusted charge current and to charge the battery unit 1 accordingly at operation S34. When the battery unit 1 is completely charged, the controller 50 controls the battery charging unit 20 to no longer charge the battery unit 1, so that charging of the battery unit 1 terminates.

Figure 7:
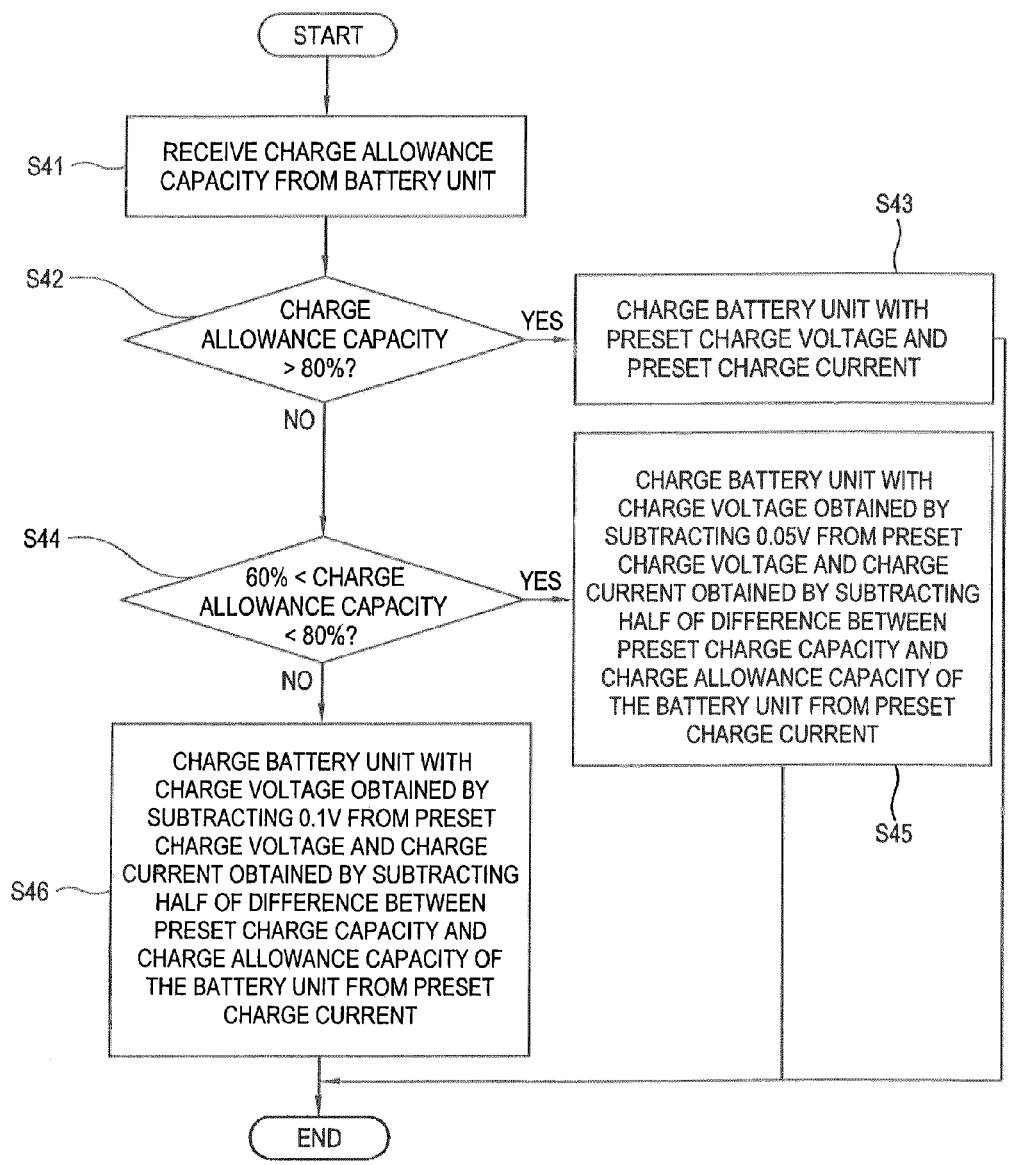
FIG. 7 is a flowchart illustrating charging control by a battery charging apparatus according to yet another exemplary embodiment.

FIG. 7 is a flowchart illustrating charging control by a battery charging apparatus 100 according to yet another exemplary embodiment.

In the charging control by the battery charging apparatus according to this embodiment as compared to the previous embodiment, the charge allowance capacity of the battery unit is different in a plurality of steps, and the preset charge voltage and the preset charge current of the battery unit 1 are adjusted to have a predetermined value preset in each step.

As shown in FIG. 7, the controller 50 controls the interface unit 10 to receive information about the battery unit 1 from the battery unit 1 which is currently connected to the battery charging apparatus 100 at operation S41. The information about the battery unit 1 is described above with reference to FIG. 2, and thus a description thereof is omitted herein for brevity.

The controller 50 calculates a percentage of the charge allowance capacity with respect to the preset charge capacity of the battery unit 1 using the information about the battery unit 1 received from the interface unit 10. Then, the controller 50 determines whether the calculated percentage of the charge allowance capacity is 80% or more at operation S42. When the calculated percentage of the charge allowance capacity is identified to be 80% or more, the controller 50 controls the battery charging unit 20 to output a power having the preset charge voltage and the preset charge current received through the interface unit 10 as they are to the battery unit 1 (operation S43).

When the calculated percentage of the charge allowance capacity is 60% or more and less than 80% (operation S44), the controller 50 adjusts the preset charge voltage of the battery unit 1 received through the interface unit 10 by subtracting 0.05V from the preset charge voltage, adjusts the preset charge current by the equation of adjusting the charge current described in the embodiment of FIG. 4, and controls the battery charging unit 20 to output a power having the adjusted charge voltage and the adjusted charge current at operation S45.

When the calculated percentage of the charge allowance capacity is determined to be 60% or less (operation S44), the controller 50 adjusts the preset charge voltage of the battery unit 1 received through the interface unit 10 by subtracting 0.1V from the preset charge voltage, adjusts the preset charge current by the equation of adjusting the charge current described in the embodiment of FIG. 4, and controls the battery charging unit 20 to output a power having the adjusted charge voltage and the adjusted charge current at operation S46.

The controller 50 controls the battery charging unit 20 to output a power having the adjusted charge voltage and the adjusted charge current and to charge the battery unit 1 accordingly. When the battery unit 1 is completely charged, the controller 50 controls the battery charging unit 20 to no longer charge the battery unit 1, so that charging of the battery unit 1 terminates.

The charge allowance capacity is different in three separate sections in the present embodiment, but is not limited thereto. The charge allowance capacity may be different in several to tens of sections depending on the setting.

Figure 8:
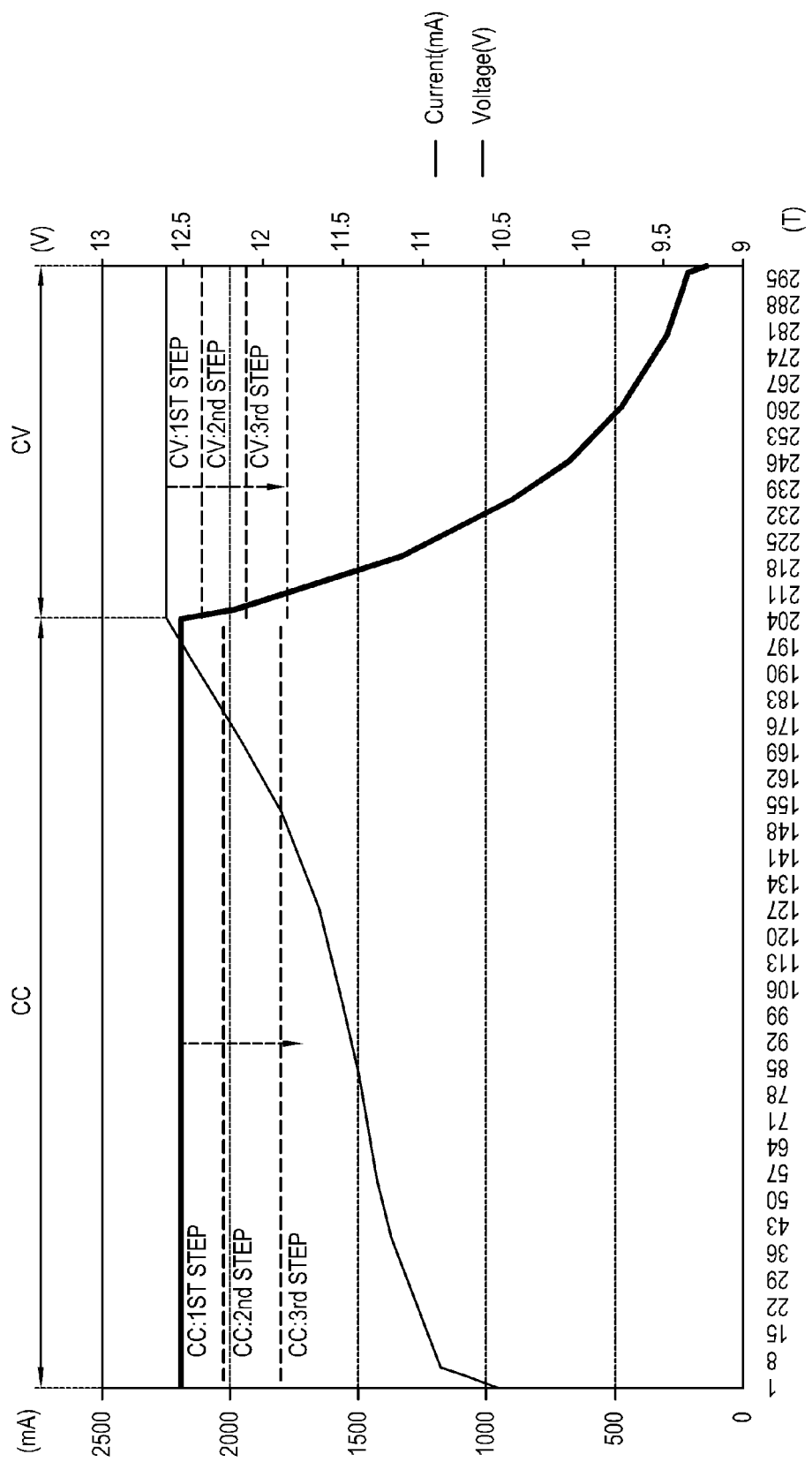
FIG. 8 illustrates a result of adjusting a charge voltage and a charge current by the battery charging apparatus according to the exemplary embodiment of FIG. 7.

FIG. 8 illustrates a result of adjusting a charge voltage and a charge current by the battery charging apparatus according to still another exemplary embodiment.

In the battery charging apparatus according to this embodiment, when the charge allowance capacity of the battery unit is different in the three separate sections, the adjusted charge voltage (CV) and the adjusted charge current (CC) are seen according to a charging time in FIG. 8.

In a first step where the calculated percentage of the charge allowance capacity is 80% or more, power having the preset charge voltage and the preset charge current of the battery unit is output as they are.

In a second step where the calculated percentage of the charge allowance capacity is 60% or more and less than 80%, power having a charge voltage and a charge current is output, the charge voltage being adjusted by subtracting 0.05V from the preset charge voltage of the battery unit 1 and the charge current being obtained by adjusting the preset charge current of the battery unit 1 by the equation of adjusting the charge current described in the embodiment of FIG. 4.

In a third step where the calculated percentage of the charge allowance capacity is less than 60%, power having a charge voltage and a charge current is output, the charge voltage being adjusted by subtracting 0.1V from the preset charge voltage of the battery unit and the charge current being obtained by adjusting the preset charge current of the battery unit by the equation of adjusting the charge current described in the embodiment of FIG. 4.

In the embodiments of FIG. 2 and FIG. 4, the charge voltage or the charge current adjusted based on the charge allowance capacity of the battery 1 is calculated, and as a result, the controller 50 may have a heavy load. Thus, in the present embodiment, the percentage of the charge allowance capacity of the battery unit is different in a plurality of sections, and a charge voltage is preset corresponding to a section, and thus the controller 50 may have fewer loads in calculation than in the embodiments of FIGS. 2 and 4.

Figure 9:
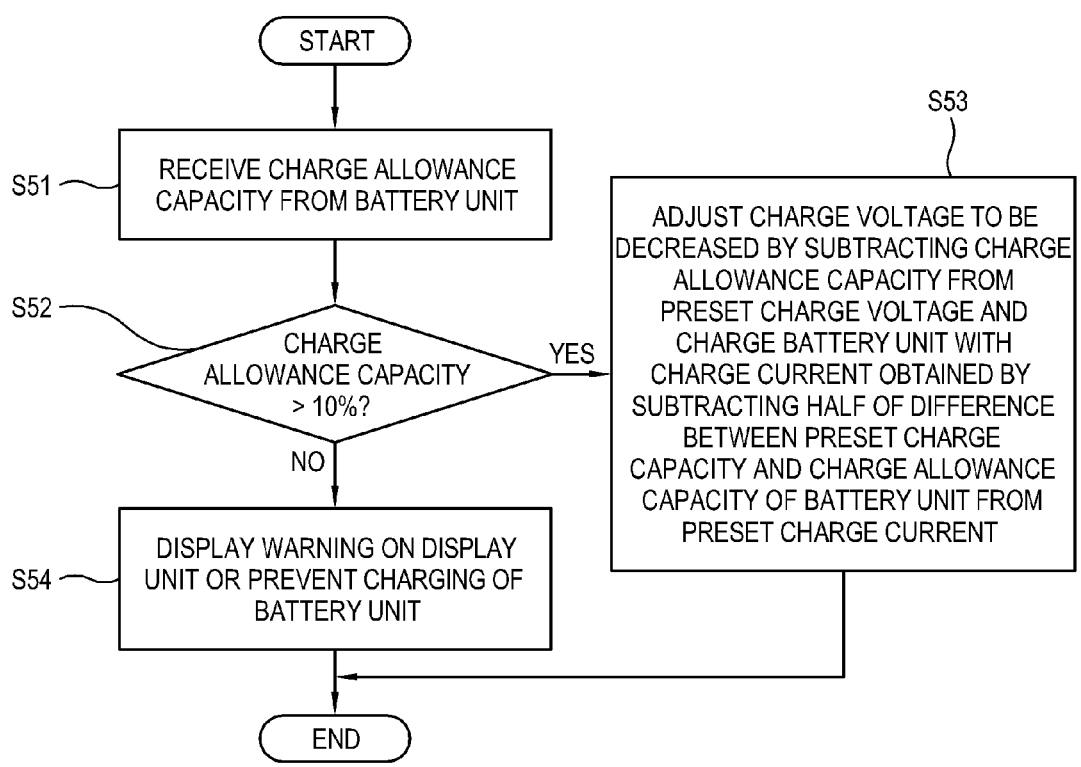
FIG. 9 is a flowchart illustrating charging control by a battery charging apparatus according to yet another exemplary embodiment.

FIG. 9 is a flowchart illustrating charging control by a battery charging apparatus according to yet another exemplary embodiment.

When the battery unit 1 which is completely discharged is to be charged, the charge allowance capacity decreases substantially, and thus full charging becomes small.

Thus, in the battery charging apparatus according to this embodiment, when the charge allowance capacity of the battery unit 1 is a preset value or less, the controller 50 may control the display unit 40 to display that charging is needed in order to warn a user, or control the battery charging unit 20 so that the battery unit 1 is minimally charged.

As shown in FIG. 9, the controller 50 controls the interface unit 10 to receive information about the battery unit 1 from the battery unit 1 connected to the battery charging apparatus at operation S51. The information about the battery unit 1 is described above with reference to FIG. 2, and thus description thereof is omitted herein.

The controller 50 calculates a percentage of the charge allowance capacity with respect to the preset charge capacity of the battery unit 1 using the information about the battery unit 1 received from the interface unit 10. Then, the controller 50 determines whether the calculated percentage of the charge allowance capacity is 10% or more at operation S52. When the calculated percentage of the charge allowance capacity is identified to be 10% or more, the controller 50 adjusts the preset charge voltage of the battery unit 1 received through the interface unit 10 by the equation of adjusting the charge voltage described in the embodiment of FIG. 2, adjusts the preset charge current by the equation of adjusting the charge current described in the embodiment of FIG. 4, and controls the battery charging unit 20 to output power having the adjusted charge voltage and the adjusted charge current at operation S53.

When the calculated percentage of the charge allowance capacity is less than 10%, the controller 50 controls the display unit 40 to display that charging is needed in order to warn the user at operation S54.

Alternatively, when information that the battery unit 1 is no longer of any use is received from the interface unit 10, the controller 50 controls the display unit 40 to display that the battery unit 1 needs replacing in order to warn the user.

In the present embodiment, the display unit 40 may be realized as a light emitting diode (LED) generally disposed around a keyboard of a personal computer (PC) or a touch pad and displaying a state of the battery unit 1 to be charged or not when the battery charging apparatus 100 is provided as the portable PC. Alternatively, the display unit 40 may be realized as a display screen of the portable PC to display a user interface (UI) indicating whether the battery unit 1 needs charging or replacing, the UI being generated by a UI generation unit (not shown) by control of the controller 50.

When the battery unit 1 is compulsorily charged to a point in which a full charge capacity is limited substantially, explosion or deformation of the battery unit may occur. In this case, charging the battery unit 1 may be prevented.

Thus, when the calculated percentage of the charge allowance capacity is identified to be 10% or less, the controller 50 adjusts the preset charge voltage and the preset charge current of the battery unit 1 received through the interface unit 10 nearly to 0 and controls the battery charging unit 20 to output having the adjusted charge voltage and the adjusted charge current, thereby preventing the battery unit from being charged at operation S54.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A system, comprising:
    a battery unit which is chargeable;
    a battery charging unit which charges the battery unit; and
    a controller which adjusts a preset charge voltage of the battery unit based on a charge allowance capacity of the battery unit to have a predetermined value, and controls the battery charging unit to output the adjusted charge voltage and to charge the battery unit,
    wherein the controller drops the preset charge voltage of the battery unit based on the charge allowance capacity of the battery unit.

2. The system according to claim 1, wherein the controller controls the battery charging unit to drop the preset charge voltage of the battery unit to the predetermined value based on the charge allowance capacity of the battery unit so that the adjusted charge voltage is output.

3. The system according to claim 2, wherein the controller drops the preset charge voltage of the battery unit by a difference between the preset charge capacity and the charge allowance capacity of the battery unit to adjust the charge voltage.

4. The system according to claim 1, wherein the controller adjusts a preset charge current of the battery unit to be decreased by a half of a difference between the preset charge capacity and the charge allowance capacity of the battery unit.

5. The system according to claim 1, wherein the controller adjusts the preset charge voltage of the battery unit based on the charge allowance capacity to have the predetermined value when the charge allowance capacity is less than or equal to a predetermined value of the preset charge capacity.

6. The system according to claim 5, wherein the charge allowance capacity is distinguished in a plurality of steps, and the predetermined value of the preset charge voltage is adjusted corresponding to the steps.

7. The system according to claim 1, further comprising:
    a display unit, wherein the controller controls the display unit to display that the battery unit needs charging when the charge allowance capacity is a preset value or less.

8. The system according to claim 7, wherein the controller controls the battery charging unit to prevent the battery unit from being charged when the charge allowance capacity is the preset value or less.

9. The system according to claim 1, further comprising:
    a power supply which provides power to the battery charging unit.

10. The system according to claim 1, wherein the battery unit comprises a smart battery.

11. A battery charging method of a system, the battery charging method comprising:
    receiving information about a chargeable battery unit, wherein the information comprises at least one of a preset charge voltage, a preset charge capacity, and a charge allowance capacity;
    adjusting, by a controller, the preset charge voltage based on the received charge allowance capacity to have a predetermined value, wherein the controller drops the preset charge voltage of the battery unit based on the charge allowance capacity of the battery unit; and
    controlling a battery charging unit to output the adjusted charge voltage and to charge the battery unit.

12. The battery charging method according to claim 11, wherein the adjusting the charge voltage drops the preset charge voltage to the predetermined value based on the charge allowance capacity to adjust the charge voltage.

13. The battery charging method according to claim 12, wherein the adjusting the charge voltage drops the preset charge voltage of the battery unit by a difference between the preset charge capacity and the charge allowance capacity of the battery unit to adjust the charge voltage.

14. The battery charging method according to claim 11, further comprising:
adjusting a charge current by adjusting a preset charge current to be decreased by a half of a difference between the preset charge capacity and the charge allowance capacity of the battery unit.

15. The battery charging method according to claim 11, wherein the adjusting adjusts the preset charge voltage based on the charge allowance capacity to have the predetermined value when the charge allowance capacity is less than or equal to a predetermined value for the preset charge capacity.

16. The battery charging method according to claim 15, wherein the charge allowance capacity is distinguished in a plurality of steps, and the predetermined value of the preset charge voltage is adjusted corresponding to the steps.

17. The battery charging method according to claim 11, further comprising:
displaying, on a display unit, that the battery unit needs charging when the charge allowance capacity received from the battery unit is a preset value or less.

18. The battery charging method according to claim 17, further comprising:
controlling, by the controller, the battery charging unit to prevent the battery unit from being charged when the charge allowance capacity received from the battery unit is the preset value or less.

19. The battery charging method according to claim 11, wherein the battery unit comprises a smart battery.

20. A system, comprising:
a battery charging unit which charges a battery unit; and
a controller which adjusts a preset charge voltage of the battery unit to be in a predetermined range based on a charge allowance capacity of the battery unit and controls the battery charging unit to output the adjusted charge voltage and to charge the battery unit,
wherein the controller drops the preset charge voltage of the battery unit based on the charge allowance capacity of the battery unit.

21. The system of claim 20, wherein the battery unit is one of a portable computer system, a laptop, a smart book, a mobile internet device (MID), a net book, a portable media player (PMP), a navigator, a smart battery or a personal digital assistant (PDA).

22. The system of claim 20, wherein the battery charging unit outputs a charge current to the battery unit under the control of the controller.

23. The system of claim 20, further comprising:
a power supply to provide power to a component of the battery charging apparatus.

24. The system of claim 23, wherein the power supply includes an alternating current-direct current (AC-DC) converter to convert common AC power input thereto to DC power.

25. The system of claim 20, wherein the charge allowance capacity of the battery unit is distinguished in a plurality of steps such that the preset charge voltage of the battery unit is adjusted to have a predetermined value in each step.

* * * * *